United States Patent
Luling et al.

(10) Patent No.: US 10,120,098 B2
(45) Date of Patent: Nov. 6, 2018

(54) DOWNHOLE DEVICE HAVING A TOROIDAL COIL WITH FLAT METALLIC STRIP

(71) Applicant: SCHLUMBERGER TECHNOLOGY CORPORATION, Sugar Land, TX (US)

(72) Inventors: Martin G. Luling, Paris (FR); Mohamed Jaidane, Paris (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 139 days.

(21) Appl. No.: 14/919,874

(22) Filed: Oct. 22, 2015

(65) Prior Publication Data
US 2016/0116625 A1    Apr. 28, 2016

(30) Foreign Application Priority Data
Oct. 22, 2014   (EP) .................................... 14290321

(51) Int. Cl.
*G01V 3/28* (2006.01)
*H01F 38/30* (2006.01)

(52) U.S. Cl.
CPC .............. *G01V 3/28* (2013.01); *H01F 38/30* (2013.01)

(58) Field of Classification Search
CPC .................................. G01V 3/28; H01F 38/30
USPC ......................................................... 324/342
See application file for complete search history.

(56) References Cited

U.S. PATENT DOCUMENTS

| | | | | |
|---|---|---|---|---|
| 2,987,668 A * | 6/1961 | Gondouin | ................ | G01V 3/26 324/221 |
| 3,007,107 A * | 10/1961 | Gondouin | ................ | G01V 3/24 324/342 |
| 3,305,771 A * | 2/1967 | Arps | ........................ | G01V 3/28 324/342 |
| 3,493,850 A * | 2/1970 | Schuster | .................. | G01V 3/26 324/342 |
| 4,511,843 A | 4/1985 | Thoraval | | |
| 4,965,778 A | 10/1990 | Parker et al. | | |
| 5,560,776 A | 10/1996 | Sugal et al. | | |
| 2005/0218898 A1 | 10/2005 | Fredette et al. | | |
| 2013/0038332 A1* | 2/2013 | Graf | ...................... | E21B 47/122 324/342 |

FOREIGN PATENT DOCUMENTS

JP       H02235313 A      9/1990

OTHER PUBLICATIONS

Extended European Search Report issued in corresponding EP Application No. 14290321.0 dated Apr. 29, 2015.

\* cited by examiner

*Primary Examiner* — Jay Patidar (57) ABSTRACT

A downhole device may include a closed ring of ferromagnetic material mounted on a conductive pipe. The downhole device may also include a first coil spirally wound around the closed ring comprising an electrically conductive flat metallic strip to substantially cover the closed ring.

14 Claims, 4 Drawing Sheets

DOWNHOLE DEVICE HAVING A TOROIDAL COIL WITH FLAT METALLIC STRIP

CROSS-REFERENCE TO RELATED APPLICATIONS

This application claims priority to EP Application No. 14290321.0 filed on Oct. 22, 2014, the entire contents of which are hereby incorporated by reference herein.

BACKGROUND

This disclosure relates to toroidal coils used for data collection, communication, or power transmission during drilling of a geological formation.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind. Identifying the composition of a geological formation can provide information about the likely presence or absence of hydrocarbons in a well. As such, many downhole tools have been developed that attempt to analyze the geological formation from within a wellbore. Electromagnetic logging tools are one type of downhole tool that may be used to measure properties of the geological formation. By measuring the way that electromagnetic signals travel through the geological formation, the composition of the geological formation may be ascertained at various depths through the well.

Traditionally, a pair of toroidal coils may be used as downhole tools to measure properties of the geological formation. The traditional toroidal coils include a dense covering of wire windings to avoid magnetic-flux leakage. However, the large number of windings results in a large impedance mismatch between an outside environment and the toroidal coil. This large impedance mismatch may significantly limit operating characteristics of the toroidal coil (e.g., an operating frequency range). Accordingly, the subject matter of the present disclosure modifies the operating characteristics of toroidal coils.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure relate to a toroidal coil used downhole on a downhole device. The toroidal coil may include wide, electrically conductive metallic strips wound spirally around a ferromagnetic ring. Additionally, the wide metallic strips may enable the toroidal coil to operate at a higher frequency than a traditionally wire wound coil. As such, the toroidal coil mounted on the drilling collar may induce an azimuthally polarized, oscillating magnetic field into a geological formation to determine the electrical resistivity of the geological formation. Further, the toroidal coil may serve to communicate a data stream via wireless telemetry, or the toroidal coil may serve to transport electric power to a remote location.

Embodiments of the disclosure relate to well logging using toroidal coils. A downhole device, according to the disclosure, may include a closed ring. The closed ring may include ferromagnetic material, and the closed ring may be mounted on a conductive pipe. Additionally, the downhole device may include a first coil that is spirally wound around the closed ring. The first coil may include an electrically conductive flat metallic strip to substantially cover the closed ring.

In another embodiment, a logging while drilling system may include a toroidal coil mounted on a drill collar. The toroidal coil may include a closed ring made of ferromagnetic material, and the toroidal coil may also include a first coil spirally wound around the closed ring. The first coil includes an electrically conductive flat metallic strip substantially covering the closed ring. Further, the toroidal coil may operate as a receiver to detect a magnetic field from an electric current flowing along the drill collar. Additionally, the logging while drilling system may also include a processor that collects data from the toroidal coil and derives an electrical resistivity of a geological formation from the data. The processor may also log the electrical resistivity while drilling a borehole.

In another embodiment, a method may include placing a downhole tool in a wellbore in a geological formation. The downhole tool may include a first toroidal coil and a second toroidal coil mounted on a conductive drill collar. Further, the first toroidal coil may include a first closed ring including ferromagnetic material and a first coil spirally wound around the first closed ring consisting of a first electrically conductive flat metallic strip to substantially cover the first closed ring. Furthermore, the second toroidal coil may include a second closed ring comprising ferromagnetic material and a second coil spirally wound around the second closed ring consisting of a second electrically conductive flat metallic strip to substantially cover the second closed ring. The method may also include transmitting an alternating current along the toroidal coil to induce a voltage drop along the conductive drill collar and to generate an electric current along the conductive drill collar and receiving the electric current along the conductive drill collar at the second toroidal coil. Additionally, the electric current may induce a voltage in the second toroidal coil indicative of electromagnetic properties of the geological formation.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are examples of the presently disclosed techniques. Additionally, in an effort to provide a concise description of these embodiments, features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Figure 1:
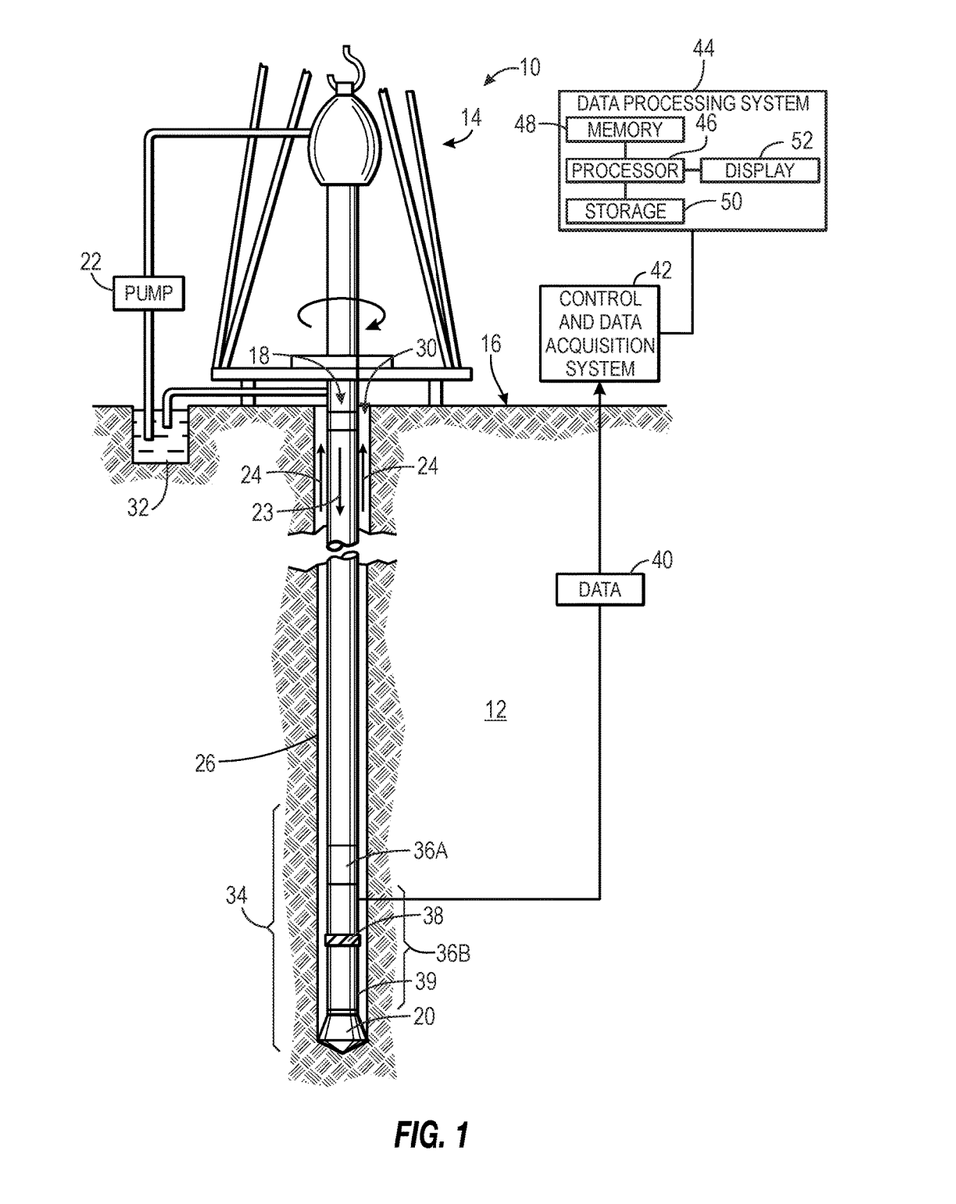
FIG. 1 is a schematic diagram of an example of a logging system that determines characteristics of a geological formation using a toroidal coil, in accordance with an embodiment.

Embodiments of the present disclosure relate to a toroidal coil used downhole on a downhole device. The toroidal coil may include a wide electrically conductive metallic strip wound spirally around a ferromagnetic ring. The metallic strips, as used herein, may mean a solid flat piece of conductive metal, or it may also mean a single flat braided strip made from several solid flat or round pieces of conductive metal. Additionally, the wide metallic strip may cover the ferromagnetic ring in a small number of turns enabling the toroidal coil to operate at a higher frequency than a traditionally wire wound coil. As such, the toroidal coil mounted on the drilling collar may induce an azimuthally polarized, oscillating magnetic field into a geological formation to determine the electrical resistivity of the geological formation. Further, the toroidal coil may serve to communicate a data stream via wireless telemetry, or the toroidal coil may serve to transport electric power to a remote location With this in mind, FIG. 1 illustrates a drilling system 10 capable of measuring electromagnetic signals to determine a composition of a geological formation 12 using a toroidal coil made at least partly from metallic strips rather than merely wires. The drilling system 10 may be used to drill a well into the geological formation 12 and obtain resistivity logging measurements useful to identify characteristics of the well. In the drilling system 10, a drilling rig 14 at the surface 16 may rotate a drill string 18 having a drill bit 20 at its lower end. As the drill bit 20 is rotated, a drilling fluid pump 22 is used to pump drilling fluid 23, which may be referred to as "mud" or "drilling mud," downward through the center of the drill string 18 in the direction of the arrow to the drill bit 20. The drilling fluid 23 may be a saltwater based drilling fluid that is electrically conductive. The drilling fluid 23, which is used to cool and lubricate the drill bit 20, exits the drill string 18 through the drill bit 20 to become return drilling fluid 24. The return drilling fluid 24 then carries drill cuttings away from the bottom of a wellbore 26 (i.e., a borehole) as it flows back to the surface 16, as shown by the arrows through an annulus 30 between the drill string 18 and the formation 12. However, as described above, as the drilling fluid 23 flows through an annulus 30 between the drill string 18 and the geological formation 12, the return drilling fluid 24 may begin to invade and mix with the fluids stored in the formation, which may be referred to as formation fluid (e.g., natural gas or oil). At the surface 16, return drilling fluid 24 is filtered and conveyed back to a mud pit 32 for reuse.

As illustrated in FIG. 1, the lower end of the drill string 18 includes a bottom-hole assembly (BHA) 34 that may include the drill bit 20 along with various downhole tools. The downhole tools may collect a variety of information relating to the geological formation 12 and/or the state of drilling of the well. For instance, a measurement-while-drilling (MWD) tool 36A may measure certain drilling parameters, such as the temperature, pressure, orientation of the drilling tool, and so forth. Likewise, a logging-while-drilling (LWD) tool 36B may measure the physical properties of the geological formation 12, such as density, porosity, resistivity, lithology, and so forth. The MWD tool 36A and/or the LWD tool 36B may include one or more toroidal coils that emit and/or detect electromagnetic signals. For example, in the illustrated embodiment, the LWD tool 36B includes a toroidal coil 38 mounted on a drill collar 39. The drill collar 39 may include a metal or conductive pipe mounted on the drill string 18 above the drill bit 20.

The MWD tool 36A and/or the LWD tool 36B may collect a variety of data 40 that may be stored and processed in the BHA 34 or, as illustrated in FIG. 1, may be sent to the surface 16 for processing. In the example of this disclosure, the MWD tool 36A and/or the LWD tool 36B may include a resistivity logging tool that emits and/or detects electromagnetic signals through a toroidal coil assembly. The data 40 that is collected may include changes in the electromagnetic signals received by the toroidal coil 38 that may represent information relating to characteristics of the geological formation 12. The data 40 may be sent via a control and data acquisition system 42 to a data processing system 44. The control and data acquisition system 42 may receive the data 40 in any suitable way. In one example, the control and data acquisition system 42 may transfer the data 40 via electrical signals pulsed through the geological formation 12 or via wireless pulse telemetry using the return drilling fluid 24. In another example, the data 40 may be retrieved directly from the MWD tool 36A and/or the LWD tool 36B upon return to the surface 16.

The data processing system 44 may include a processor 46, memory 48, storage 50, and/or a display 52. The data processing system 44 may use the data 40 to determine various properties of the well using any suitable techniques. To process the data 40, the processor 46 may execute instructions stored in the memory 48 and/or storage 50. As such, the memory 48 and/or the storage 50 of the data processing system 44 may be any suitable article of manufacture that can store the instructions. The memory 46 and/or the storage 50 may be ROM memory, random-access memory (RAM), flash memory, an optical storage medium, or a hard disk drive, to name a few examples. The display 52 may be any suitable electronic display that can display the logs and/or other information relating to properties of the well as measured by the MWD tool 36A and/or the LWD tool 36B. It should be appreciated that, although the data processing system 44 is shown by way of example as being located at the surface 16, the data processing system 44 may be located in the MWD tool 36A and/or the LWD tool 36B. In such embodiments, some of the data 40 may be processed and stored downhole, while some of the data 40 may be sent to the surface 16 in real time. This may be the case particularly in LWD, where a limited amount of the data 40 may be transmitted to the surface 16 during drilling.

Figure 2:
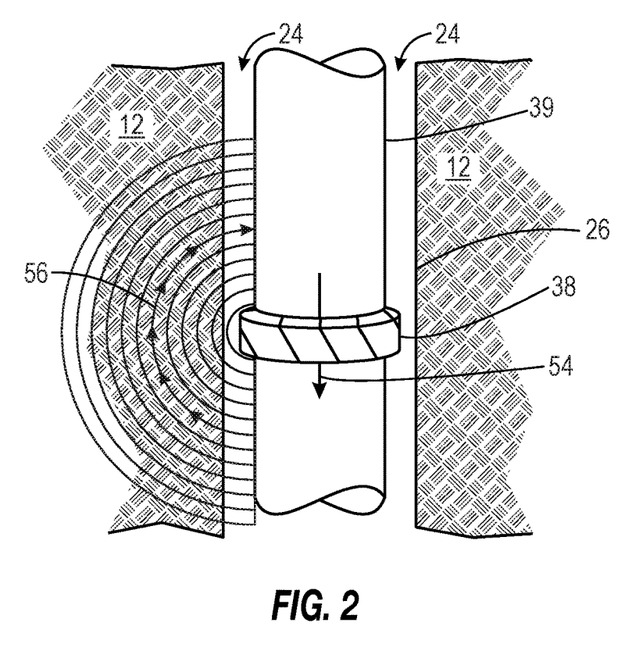
FIG. 2 is a schematic view of the toroidal coil mounted on a mechanically continuous drill collar to measure an electrical resistivity of the geological formation, in accordance with an embodiment.

It should be noted that, although the toroidal coil 38 of this disclosure is described by way of example in a logging-while-drilling (LWD) configuration, any other suitable means of conveyance may be employed (e.g., wireline, slickline, coiled tubing, and so forth). Moreover, the particular application of the toroidal coil 38 may vary. Using the toroidal coil 38 to determine resistivity is described here by way of example as one way the toroidal coil 38 may be used. One example of the LWD configuration appears in FIG. 2, which illustrates an example of the toroidal coil 38 mounted on the drill collar 39, as shown in FIG. 1. The toroidal coil 38 of FIG. 2 is shown inside the wellbore 26, which is filled with the return drilling fluid 24. As illustrated, when the toroidal coil 38 carries and/or is coupled to an alternating source current, the toroidal coil 38 may create a voltage drop across the drill collar 39. In a conductive medium, such as the return drilling fluid 24, the voltage drop across the drill collar 39 may generate an electric current 54 along the drill collar 39. While the electric current 54 alternates, the electric current 54 generates an azimuthally polarized electromagnetic field 56 through both the return drilling fluid 24 and the geological formation 12.

Once the azimuthally polarized electromagnetic field 56 is generated, the geological formation 12 may interact with the electromagnetic field 56. This interaction may be indicative of an electrical resistivity of the geological formation 12. Further, the resistivity of the geological formation 12, as mentioned above, may be used as a factor to determine a mineral composition of the geological formation 12 as the wellbore 26 is drilled. In this manner, the electromagnetic field 56 may indicate the electrical resistivity of the geological formation 12 by measuring amplitude and phase changes of the electromagnetic field 56 due to interaction with the geological formation 12. The toroidal coil 38, according to the disclosure, may be used as a receiver or a transmitter, while another type of toroidal coil may also be used as the transmitter or the receiver respectively. In other words, the toroidal coil 38 may be paired with another type of toroidal coil to create a transmitter/receiver combination.

Additionally, an additional toroidal coil 38 (not shown) may be placed along the drill collar 39 to operate as a receiver. The additional toroidal coil 38 may operate as a receiver to collect data provided by the changes to the electromagnetic field 56. For example, the alternating current 54 along the drill collar 39 may induce a voltage in the additional toroidal coil 38. The voltage may be transmitted via wireless telemetry through the return fluid 24 to the surface 16 of the wellbore 26 as a signal representation of the electrical resistivity of the geological formation 12. Additionally, a memory device may be included as part of the additional toroidal coil 38. In this instance, the toroidal coil 38 may generate the voltage induced by the alternating current 54 along the drill collar 39, and the value of the voltage may be recorded in the memory device at the toroidal coil 38. This may take the place of a wireless telemetry transmission of the signal to the surface 16 of the wellbore 26, and allow an operator to collect data recorded on the memory device after the additional toroidal coil 38 is removed from the wellbore 26.

Figure 3:
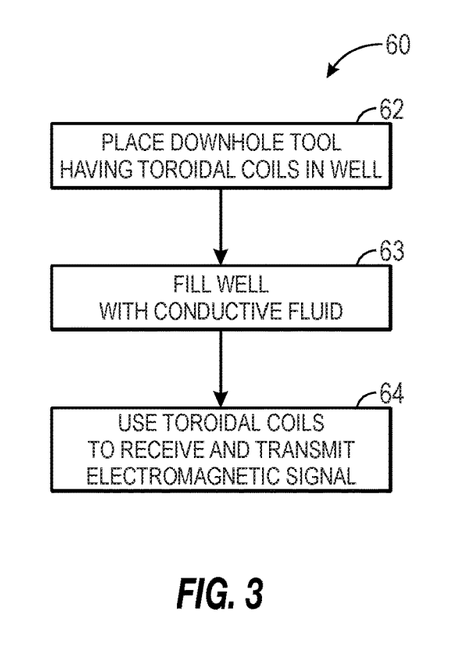
FIG. 3 is a flowchart of a method for receiving and transmitting electromagnetic signals via the toroidal coils, in accordance with an embodiment.

With the foregoing in mind, a flowchart 60 of FIG. 3 provides an example of how the toroidal coils 38 may identify properties of the geological formation 12. The flowchart 60 begins when a downhole tool, such as an MWD tool 36A or an LWD tool 36B, is placed into the well (block 62). Using the toroidal coils 38 as described in the description of FIG. 2 as an example, the toroidal coils 38 mounted on the drill collar 39 may be placed into the wellbore 26 as the drill string 18 is used to drill the wellbore 26. By placing the toroidal coils 38 in the wellbore 26 during drilling, the toroidal coils 38 are capable of logging identified properties of the geological formation 12 as the wellbore 26 is drilled.

After placing the downhole tool in the wellbore 26, the wellbore 26 is filled with a conductive fluid, or the downhole tool is placed in the wellbore 26 previously filled with the conductive fluid prior to placing the downhole tool in the wellbore 26 (block 63). The conductive fluid may be the return fluid 24 of the saltwater based drilling fluid 23. As one of the toroidal coils 38 induces an alternating voltage in the drill collar 39, the conductive fluid enables current generation along the drill collar 39, for example.

Subsequently, two or more toroidal coils 38 may be used to receive and transmit electromagnetic signals (block 64). A first of the toroidal coils 38 functioning as a receiver detects the magnetic field 56 from any alternating electric current that flows axially along the drill collar 39. Because the magnetic field 56 resulting from the alternating electric current of the drill collar 39 is azimuthally polarized, the magnetic field 56 induces a voltage in the toroidal coil 38. The voltage induced in the toroidal coil 38 may be representative of the resistivity of the geological formation 12.

Additionally, when a second of the toroidal coils 38 acts as a transmitter, the toroidal coil 38 carries an alternating current. The alternating current produces the azimuthally polarized magnetic field to induce a secondary voltage in the drill collar 39. In such a situation, the drill collar 39 and its surrounding conductive environment (e.g., the return fluid 24 and the geological formation 12) act as a single-turn secondary winding of a transformer that also includes the toroidal coil 38 as a multi-turn primary winding. While the toroidal coil 38 acts as a transmitter, the transformer created by the toroidal coil 38 and the drill collar 39 operates as a power transformer. The induced secondary voltage in the drill collar 39 generates a secondary current, which flows through and interacts with the geological formation 12. The first of the toroidal coils 38 discussed above may detect the secondary current representative of the resistivity of the geological formation 12.

Further, in another embodiment, the toroidal coil 38 may function as a communication device to communicate a data stream through wireless telemetry. In such an example, the toroidal coil 38 may transmit signals into the return fluid 24, which may be detected at the surface 16 of the wellbore 26, or any additional intermediate station along a path to the surface 16 of the wellbore, and converted into usable data by the processor 46. In this manner, communicating via wireless telemetry may operate to bridge an installation obstructing a directly wired communication path in an extended bottom-hole assembly, and the additional intermediate stations along the path may function as repeaters in a multistage telemetry link.

Moreover, the toroidal coil 38, in yet another embodiment, may function by transporting electric power to a remote location (e.g., down the wellbore 26). Indeed, transformers are used in power transmission. For example, in a staged completion of a power grid, transformers may be used in place of coupling the power and communication lines of stages completed or installed at different times using a wire. The use of a transformer with fewer turns (e.g., the toroidal coils 38) may improve efficiency in power transmission and signal integrity by reducing inductive losses. Similarly, in the drill string 18, in which communication and power is transmitted between sections of the drill string 18 via transformers, employing the toroidal coils 38 as the transformers may result in a reduction of losses due to the reduction in coil turns within the transformers. Accordingly, fewer repeaters may be used to transmit communication and power in the drill string 18, and the reliability of the signals may also increase.

Figure 4:
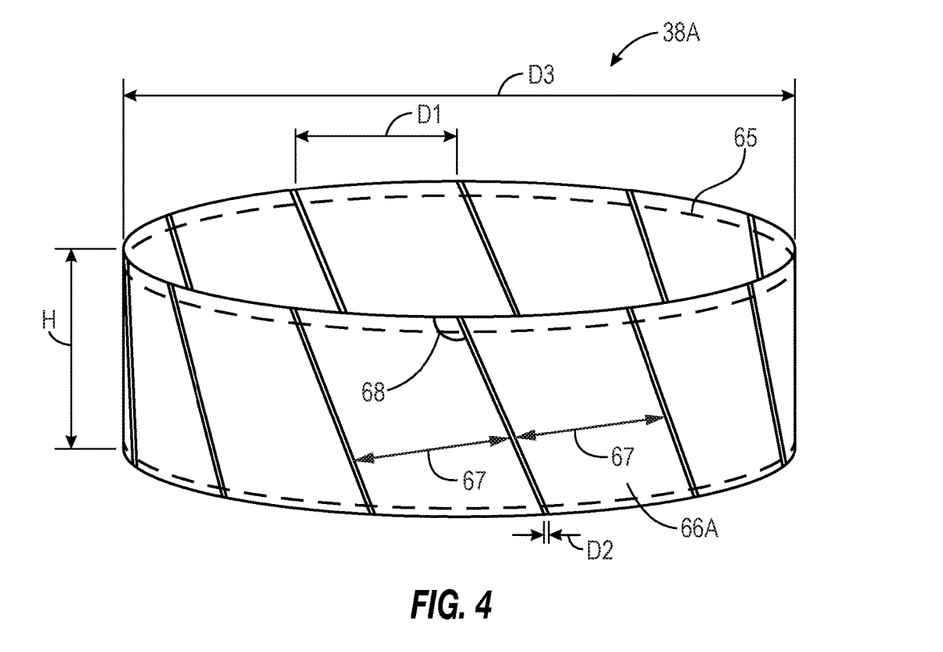
FIG. 4 is an embodiment of the toroidal coil including windings made of an electrically conductive flat metallic strip, in accordance with an embodiment.

One embodiment of the toroidal coil 38 is illustrated in FIG. 4. FIG. 4 depicts a toroidal coil 38A including a conductive flat metallic strip 66A wrapped around a ferromagnetic ring 65 shown in dotted lines. The ferromagnetic ring may be of any section, such as a parallelepiped section, optionally with a rounded edge to facilitate wrapping, or a circular section, etc. The metallic strip 66A may be made from any strong electrical conductor. For example, the metallic strip 66A may be made from a long strip of copper. Additionally, the ferromagnetic ring may typically be made from a mu-metal or a permalloy. As discussed in detail below, the width D1 of the metallic strip may be based on the desired number of turns or windings of the toroidal coil, an angle 68 of the advancing windings, and the dimensions of the ferromagnetic ring. Further, a distance D2 between each winding 67 of the metallic strip 66A may be minimized to trap magnetic flux within the ferromagnetic ring and to minimize any magnetic flux leakage in a radial or a vertical direction. The distance D2 may also be uniform at every winding of the metallic strip 66A. For example, there may be a tolerance of less 5% of the width D1 of the metallic strip 66 between each winding. Uniformity of the distance D2 may establish uniform standards in manufacture and provide enhanced reliability in the operation of the toroidal coil 38A.

Further, the toroidal coil 38A includes an axial height H and a diameter D3. The diameter D3 of the toroidal coil 38A may be slightly larger than the diameter of the drill collar 39. In this manner, the toroidal coil 38A may be mounted on the drill collar 39. Additionally, the axial height H, in combination with the diameter D3, may enable a manufacturer the ability to determine a surface area of the metallic strip 66A used to sufficiently cover the entire ferromagnetic ring.

It may be appreciated that the metallic strip 66A significantly reduces the number of windings used to substantially cover the ferromagnetic ring in comparison with a traditional round-wire wound toroidal coil. For example, the toroidal coil 38A may include between 10 and 20 windings, where a round-wire wound toroidal coil typically includes in excess of 100 windings to achieve sufficient coverage of a ferromagnetic ring. Due to the limited number of windings, the turn ratio between the primary windings (i.e., the toroidal coil 38A) and the secondary winding (i.e., the drill collar 39 and its conductive surrounding environment) is improved. In improving the turn ratio, an induced secondary voltage in the drill collar 39 from the toroidal coil 38A is increased when the toroidal coil 38A operates as a transmitter. Additionally, the improved turn ratio may increase a measured secondary current in the toroidal coil 38A generated from a current along the drill collar 39 while the toroidal coil operates as a receiver. In this manner, power transmission and signal detection through the toroidal coil 38A is improved by limiting the number of windings used to substantially cover the ferromagnetic ring.

Additionally, reducing the number of windings in the toroidal coil 38A also reduces an impedance mismatch between the toroidal coil 38A and the secondary winding. For example, a toroidal coil 38 with turns of wire in excess of 100 may have a comparatively high impedance while a single turn secondary winding has a far lower impedance. However, when the toroidal coil 38A has between 10 and 20 turns, an impedance of the toroidal coil 38A may be much closer to the impedance of the secondary winding. For example, when the toroidal coil 38A has between 10 and 20 turns, the inductance of the toroidal coil 38A may be between 100 μH and 1 mH. As the inductance of the toroidal coil 38A decreases, the impedance of the toroidal coil 38A also decreases. Accordingly, the impedance mismatch between the toroidal coil 38A and the secondary winding decreases as the number of turns of the toroidal coil 38A decreases.

Further, reducing the impedance mismatch may enable the use of higher frequencies in the toroidal coil 38A. Large impedance mismatches may limit an available frequency range for operation of the toroidal coil 38A. As the impedances of the primary winding and the secondary winding grow closer, the frequency range available for operation of the toroidal coil 38A also increases. Therefore, with fewer turns in the toroidal coil 38A, the available operating frequency may be greater than an operating frequency of a round-wire wound toroidal coil with a large impedance mismatch. For example, the toroidal coil 38A may operate in a frequency range greater than 1.5 kHz in some examples, or greater than 5 kHz, 10 kHz, etc. and up to several MHz in other examples, depending on winding characteristics of the toroidal coil 38A.

Figure 5:
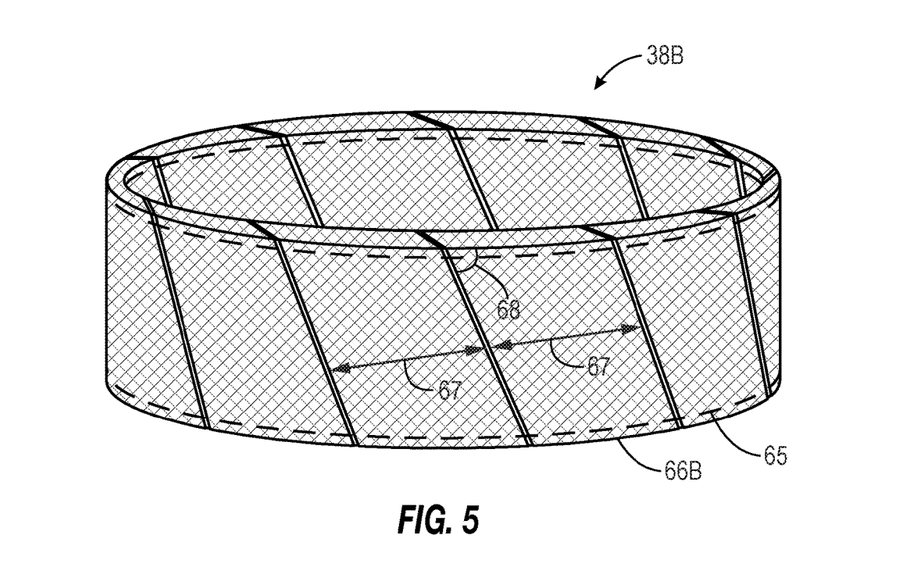
FIG. 5 is an embodiment of the toroidal coil including windings made of an electrically conductive braid of electrically conductive flat metallic strips, in accordance with an embodiment.

In another embodiment, a toroidal coil 38B may include a conductive flat metallic strip 66B made from a braid of metallic strips, as illustrated in FIG. 5. The braid of metallic strips may include strips of copper braided to form the metallic strip 66B with comparable dimensions and operation to the metallic strip 66A. In braiding several copper strips, the metallic strip 66B may have greater malleability and ductility due to the braid than the metallic strip 66A. Because of this heightened malleability, the metallic strip 66B may enable a more efficient winding process than the metallic strip 66A. Further, a manufacturer of the toroidal coil 38 may have greater control over the distance D2 between the windings 67 of the toroidal coil 38 as well as the angle 68 of the advancing windings. The metallic strip 66B may also be more maneuverable around a contour of the ferromagnetic ring 65 enabling a greater coverage during winding.

Additionally, the metallic strips 66A and 66B may include an insulating coating (not shown) to insulate the metallic strips 66A and 66B from short circuit conditions while the metallic strips 66A and 66B are wound around the ferromagnetic ring. In this manner, the manufacturer may be able to minimize the distance D2 between windings of the toroidal coil 38 without worrying about short circuits across the windings. Additionally, minimizing the distance D2 may increase coverage of the ferromagnetic ring and limit magnetic flux leakage from the ferromagnetic ring.

Figure 6:
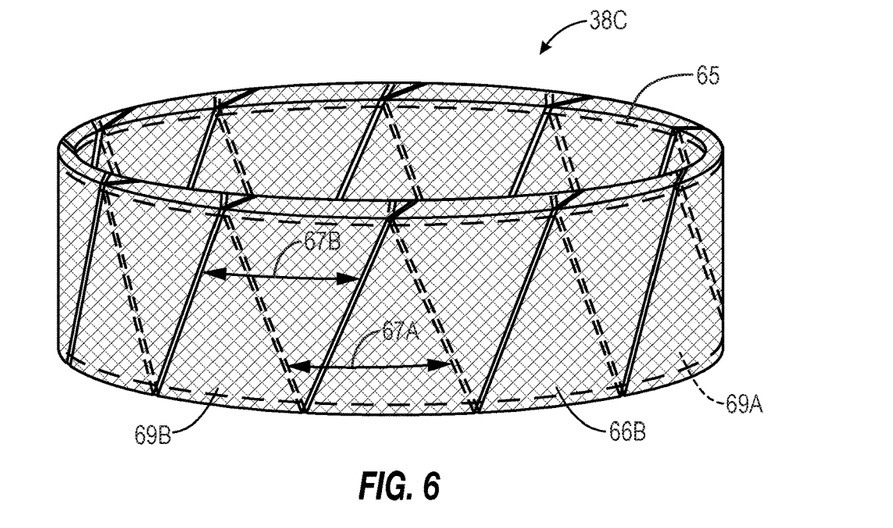
FIG. 6 is an embodiment of the toroidal coil of FIG. 5 including a second winding of the electrically conductive braid wound in an opposite direction from a winding of FIG. 5, in accordance with an embodiment.

Due to the angle 68 of the advancing windings, FIG. 6 illustrates a toroidal coil 38C with a second layer 69B of the metallic strip 66B comprising, a second plurality of windings 67B wound around the ring 65 over a first layer 69A (shown in dotted line) comprising a first plurality of windings 67A. The second windings 67B are in an opposite direction relative to the direction of the first windings 67A of the first layer 69A of the metallic strip 66B. Such a configuration may cancel any parasitic electromagnetic modes resulting from the large angle 68 to ensure a substantially azimuthally polarized magnetic field within the ferromagnetic ring. Further, it should be noted that while FIG. 6 illustrates the second winding of the metallic strip 66B, a second winding 67B of the metallic strip 66A may also be performed. That is, a non-braided metallic strip 66A may also be used for winding the second layer 69B. For example, to ensure a substantially azimuthally polarized magnetic field in the ferromagnetic ring within the winding of the metallic strip 66A, a second winding of the metallic strip 66A in the opposite direction may be accomplished in a similar manner to FIG. 6.

Figure 7:
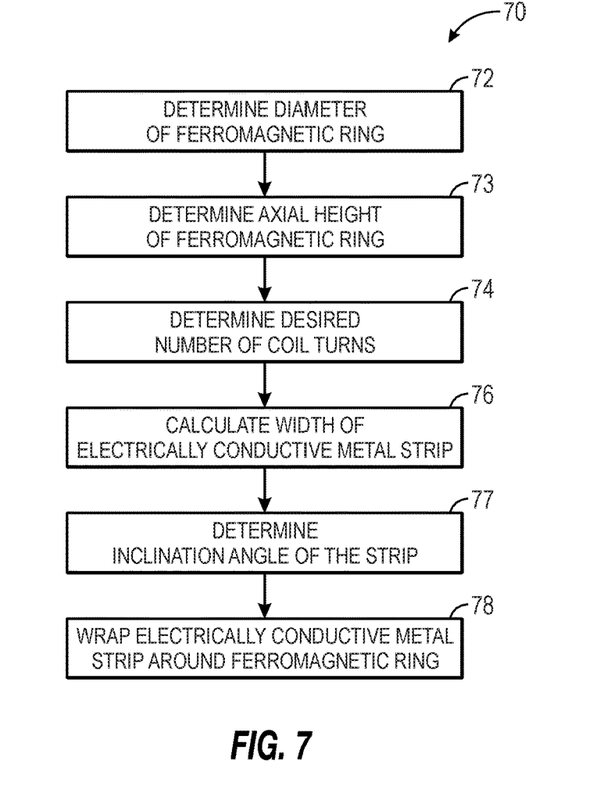
FIG. 7 is a flowchart of a method for manufacturing a toroidal coil, in accordance with an embodiment.

Further, a flowchart 70 of FIG. 7 provides an example of a method of manufacture of the toroidal coil 38. Initially, the diameter D3 of the ferromagnetic ring is determined (block 72). The ferromagnetic ring is mounted on the drill collar 39. Therefore, the ferromagnetic ring should maintain a diameter D3 just large enough for the thickness of the windings of the metallic strip 66 to fit between the ferromagnetic ring and the drill collar 39. Typically, a diameter D3 of the drill collar 39 is in the range of 4-8 inches. As such, the diameter D3 of the ferromagnetic ring should be slightly larger than the diameter of the drill collar 39.

Subsequently, the axial height H of the ferromagnetic ring is determined (block 73). The axial height H of the ferromagnetic ring may generally be around 1 inch. Using the axial height H and the diameter D3 of the ferromagnetic ring, a manufacturer can determine a total amount of material from which to form the metallic strip 66 to completely cover a surface of the ferromagnetic ring.

Additionally, the manufacturer may determine a desired number of coil turns of the toroidal coil 38 surrounding the ferromagnetic ring (block 74). The desired number of coil turns may generally be in the range of 10 to 20 turns, but more turns or less turns are also anticipated depending on desired characteristics of the toroidal coil 38. In a toroidal coil using thin, round wire for coil windings, the toroidal coil may include hundreds of windings to ensure complete coverage of a ferromagnetic ring. Such coverage may not include uniform spacing between windings, and the large number of turns may lead to unfavorable transformer conditions due to a high number of primary windings compared to only one secondary winding (e.g., only one secondary winding made up of the drill collar 39). Additionally, high inductive impedance in the toroidal coil prohibits the use of the toroidal coil at high frequencies. Further, a toroidal coil using thin, round wire for coil windings with a low impedance would not result in full coverage of the ferromagnetic ring. Therefore, such an embodiment would result in large amounts of magnetic flux leakage. Therefore, selecting a low number of coil turns while maintaining full coverage of the ferromagnetic coil may enable higher frequency operation of the toroidal coil 38 while minimizing magnetic flux leakage.

After determining the desired number of coil turns, a width of the metal strip 66 at a top and a bottom of the ferromagnetic ring may be determined (block 76). The following equation may be used to determine the appropriate width to substantially cover the ferromagnetic ring:

$$n = \frac{l}{w'}, \qquad \text{(Equation 1)}$$

where n is the desired number of coil turns, l is a ring circumference calculated with the ring diameter, and w' is the width of the metal strip 66 at a top and a bottom of the ferromagnetic ring. Once w' is determined, a value of the width of the metal strip 66 that is less than w' may be selected, and the angle 68 of the advancing windings may be calculated (block 77). The following equation may be used for calculating the angle 68 of the advancing windings:

$$w' = \frac{w}{\cos\theta}, \qquad \text{(Equation 2)}$$

where w is the width of the metal strip 66, and θ is the angle 68 of the advancing windings. Solving for θ results in determining the angle 68.

Once the width of the metal strip 66 and the angle 68 of the advancing windings are determined, the metal strip 66 may be wrapped around the ferromagnetic ring (block 78). The metal strip 66 may be wrapped around the ferromagnetic ring such that there is uniform spacing between the windings, and such that the ferromagnetic ring is substantially covered by the metal strip 66. Further, as discussed above, upon completion of the first winding, the second winding of the metallic strip 66 may be wound in the opposite direction of the first winding. In this manner, the second winding may counter a parasitic electromagnetic mode (i.e., a transverse electric mode) resulting from the angle 68 of the advancing windings in the first winding. The transverse electric mode may cause minor or negligible effects, but the second winding may readily remove or suppress the effects. Upon completion of the windings, the toroidal coil 38 may be mounted on a drill collar 39 in preparation for use within the wellbore 26.

The specific embodiments described above have been shown by way of example, and it should be understood that these embodiments may be susceptible to various modifications and alternative forms. It should be further understood that the claims are not intended to be limited to the particular forms disclosed, but rather to cover modifications, equivalents, and alternatives falling within the spirit and scope of this disclosure.

For example, some embodiments may include:

A downhole device comprising:

a closed ring comprising ferromagnetic material mounted on a conductive pipe; and a first coil spirally wound in a first winding around the closed ring, wherein the first coil comprises an electrically conductive flat metallic strip to substantially cover the closed ring.

The downhole device may also comprise a second winding spirally wound around the first winding in an opposite direction and comprising an electrically conductive flat strip. The second winding may be realized with the first coil or with an additional coil.

The electrically conductive flat strip of the first winding, the second winding, or both may comprise an electrically conductive braid.

The electrically conductive braid of the first winding, the second winding, or both may comprise an insulating coating.

The electrically conductive flat strip of the first winding, the second winding, or both may comprise a copper flat wire.

The downhole device may be configured to generate an oscillating magnetic field.

An inductance of the first coil may be lower than 1 mH, for instance between 100 μH and 1 mH.

Space between each turn of the first winding, the second winding, or both may be uniform.

The space between each turn of the first winding, the second winding, or both may be less than 5% of the width of the electrically conductive flat strip.

A number of turns of the first winding, the second winding, or both may be with less than 20, for instance between 10 and 20 turns.

The disclosure also relates to a logging while drilling system, comprising:

a toroidal coil mounted on a drill collar, wherein the toroidal coil comprises:

a closed ring comprising ferromagnetic material; and a first coil spirally wound around the closed ring comprising an electrically conductive flat metallic strip to substantially cover the closed ring, wherein the toroidal coil operates as a receiver to detect a magnetic field from an electric current flowing axially along the drill collar; and a processor configured to:

collect data from the toroidal coil; and derive an electrical resistivity of a geological formation from the data.

The logging while drilling system may also log the electrical resistivity of the formation.

The logging while drilling system may comprise a second toroidal coil mounted on the drill collar, wherein the second toroidal coil comprises:

a second closed ring comprising ferromagnetic material; and a second coil spirally wound around the second closed ring comprising a second electrically conductive flat metallic strip to substantially cover the second closed ring, wherein the second toroidal coil operates as a transmitter by transmitting an alternating source current along the second toroidal coil to induce a voltage drop along the drill collar and to generate an electric current flowing axially along the drill collar.

The disclosure also relates to a logging while drilling system, comprising:

a toroidal coil mounted on a drill collar, wherein the toroidal coil comprises:

a closed ring comprising ferromagnetic material; and a coil spirally wound around the closed ring comprising an electrically conductive flat metallic strip to substantially cover the closed ring, wherein the second toroidal coil operates as a transmitter by transmitting an alternating source current along the second toroidal coil to induce a voltage drop along the drill collar and to generate an electric current flowing axially along the drill collar.

Such a logging while drilling system may also comprise an additional toroidal coil acting as a receiver and a processor as defined above. The electric current flowing axially along the drill collar may induce an oscillating magnetic field that oscillates at a frequency greater than 1.5 kHz.

Any of the toroidal coil may communicate with the processor via wireless telemetry.

The electrically conductive flat metallic strip may also comprise a strip of braided electrically conductive bands.

The first toroidal coil, the second toroidal coil or both may comprise at least a winding with less than 20 turns around the closed ring, for instance between 10 and 20 turns.

Any of the first and second coil of the logging while drilling system may be as defined above.

The disclosure also relates to a method comprising:

placing a downhole tool in a wellbore in a geological formation, wherein the downhole tool comprises a first toroidal coil and a second toroidal coil mounted on a conductive drill collar, and wherein the first toroidal coil comprises a first closed ring comprising ferromagnetic material and a first coil spirally wound around the first closed ring comprising a first electrically conductive flat metallic strip to substantially cover the first closed ring, and the second toroidal coil comprises a second closed ring comprising ferromagnetic material and a second coil spirally wound around the second closed ring comprising a second electrically conductive flat metallic strip to substantially cover the second closed ring;

transmitting an alternating source current along the first toroidal coil to induce a voltage drop along the conductive drill collar and to generate an electric current along the conductive drill collar; and receiving the electric current along the conductive drill collar at the second toroidal coil, wherein the electric current induces a voltage in the second toroidal coil indicative of electromagnetic properties of the geological formation.

The first coil may comprise a second winding of the first electrically conductive flat metallic strip spirally wound around a first winding of the first electrically conductive flat metallic strip in an opposite direction of the first winding of the first electrically conductive flat metallic strip, and/or the second coil may comprise a second winding of the second electrically conductive flat metallic strip spirally wound around a first winding of the second electrically conductive flat metallic strip in an opposite direction of the first layer of the second electrically conductive flat metallic strip.

The method may comprise transmitting an electromagnetic signal induced by the voltage in the second toroidal coil to the processor via wireless telemetry.

The second toroidal coil may indicate the electrical resistivity of the geological formation.

The invention claimed is:

1. A downhole device comprising:

a closed ring comprising ferromagnetic material mounted on a conductive pipe; and a first coil spirally comprising an electrically conductive flat metallic strip wound around the closed ring in a plurality of first windings to substantially cover the closed ring, wherein the electrically conductive flat metallic strip is wound around a direction corresponding to a tangential axis of the closed ring so as to cover alternately an inside face and an outside face of the closed ring.

2. The downhole device of claim 1, wherein the electrically conductive flat metallic strip wound in a plurality of first windings is a first layer of electrically conductive flat metallic strip, the device further comprising a second layer of electrically conductive flat metallic strip spirally wound around the first layer in a plurality of second windings in an opposite direction relative to the direction of the first windings.

3. The downhole device of claim 2, wherein the first layer of electrically conductive flat strip, the second layer of electrically conductive flat strip, or both comprises an electrically conductive braid.

4. The downhole device of claim 2, wherein the first layer of electrically conductive flat strip, the second layer of electrically conductive flat strip, or both comprises a copper flat wire.

5. The downhole device of claim 2, wherein spaces D2 between two consecutive windings of the first layer of electrically conductive flat metallic strip, second layer of electrically conductive flat metallic strip, or both are uniform.

6. The downhole device of claim 5, wherein the space between two consecutive windings of the of the first layer of electrically conductive flat metallic strip, second layer of electrically conductive flat metallic strip or both is less than 5% of the width of the electrically conductive flat strip.

7. The downhole device of claim 2, wherein a number of the first windings, the second windings, or both is lower than 20.

8. The downhole device of claim 1, wherein the downhole device is configured to generate an oscillating magnetic field.

9. The downhole device of claim 1, wherein an inductance of the first coil is lower than 1 mH.

10. A logging while drilling system, comprising:
a first toroidal coil mounted on a drill collar, wherein the first toroidal coil comprises:
a first closed ring comprising ferromagnetic material; and
a first coil comprising a first electrically conductive flat metallic strip spirally wound around the first closed ring in a plurality of windings to substantially cover the first closed ring wherein the first coil is wound around a direction corresponding to a tangential axis of the closed ring so as to cover alternately an inside face and an outside face of the closed ring,
wherein the first toroidal coil operates as a receiver to detect a magnetic field from an electric current flowing axially along the drill collar; and
a processor configured to:
collect data from the toroidal coil; and
derive an electrical resistivity of a geological formation from the data.

11. The logging while drilling system of claim 10, comprising a second toroidal coil mounted on the drill collar, wherein the second toroidal coil comprises:
a second closed ring comprising ferromagnetic material; and
a second coil spirally wound around the second closed ring comprising a second electrically conductive flat metallic strip to substantially cover the second closed ring, wherein the second toroidal coil operates as a transmitter by transmitting an alternating source current along the second toroidal coil to induce a voltage drop along the drill collar and to generate an electric current flowing axially along the drill collar.

12. A method comprising:
placing a downhole tool in a wellbore in a geological formation, wherein the downhole tool is according to claim 11;
transmitting an alternating source current along the first toroidal coil to induce a voltage drop along the conductive drill collar and to generate an electric current along the conductive drill collar; and
receiving the electric current along the conductive drill collar at the second toroidal coil, wherein the electric current induces a voltage in the second toroidal coil indicative of electromagnetic properties of the geological formation.

13. The logging while drilling system of claim 10, wherein the electric current flowing axially along the drill collar induces an oscillating magnetic field that oscillates at a frequency greater than 1.5 kHz.

14. The logging while drilling system of claim 10, wherein the first toroidal coil communicates with the processor via wireless telemetry.

* * * * *